Figure 1:
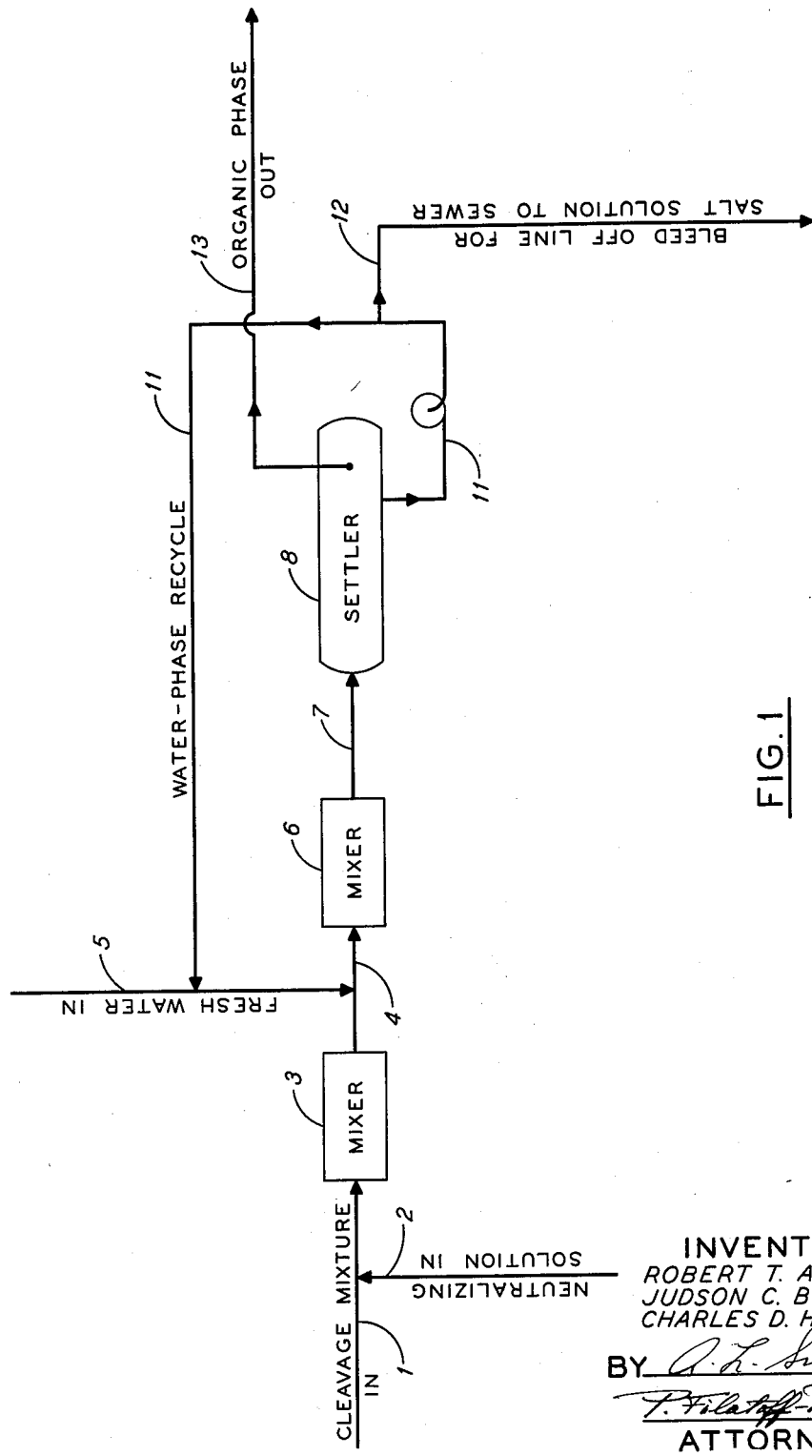

Feb. 7, 1956     R. T. ADAMS ET AL     2,734,085
REMOVAL OF SALTS FROM ACETONE-PHENOL MIXTURES
Filed April 8, 1952     2 Sheets-Sheet 2

INVENTORS
ROBERT T. ADAMS
JUDSON C. BUTLER
CHARLES D. HEATON
BY
ATTORNEYS

United States Patent Office 2,734,085
Patented Feb. 7, 1956

2,734,085

REMOVAL OF SALTS FROM ACETONE-PHENOL MIXTURES

Robert T. Adams, Walnut Creek, Judson C. Butler, El Sobrante, and Charles D. Heaton, El Cerrito, Calif., assignors to California Research Corporation, San Francisco, Calif., a corporation of Delaware Application April 8, 1952, Serial No. 281,212

16 Claims. (Cl. 260—593)

The present invention relates to an improvement in the manufacture of phenol.

The newest process for manufacturing phenol from cumene involves, first of all, oxidation of cumene in liquid phase with an oxygen-containing gas, usually air, carried out at a temperature from about 195 to about 240° F. and preferably in the presence of an aqueous alkali to stabilize the hydroperoxide product. The reaction product mixture obtained in this oxidation represents a solution of cumene hydroperoxide in unreacted cumene together with a small amount of by-products of oxidation, namely, dimethyl phenyl carbinol and acetophenone. The details of such an oxidation treatment of cumene are given, for instance, in U. S. Patent No. 2,548,435 to Lorand and Reese. It is usually preferred to conduct this oxidation in such a manner as to keep the conversion of cumene to cumene hydroperoxide at a level from about 25 to about 35% by weight, based on the initial cumene, since at a higher conversion level the hydroperoxide tends to decompose rapidly, and the yield falls off quite abruptly. In the process step following the oxidation, cumene hydroperoxide present in the oxidation effluent is concentrated, e. g., by fractional distillation at reduced pressure, until its concentration is equal, e. g., to about 90% by weight. In the course of this concentration step, most of the unreacted cumene is separated from the reaction product mixture and recycled to the oxidation stage, while the remaining concentrate of cumene hydroperoxide containing a small quantity of cumene and some dimethyl phenyl carbinol and acetophenone is subjected to a decomposition treatment or cleavage in the presence of an acid catalyst, e. g., sulfuric acid, acetic acid, phosphoric acid, para-toluene sulfonic acid, and usually in the presence of an inert diluent, at a temperature which may range from about 150 to about 300° F. The effluent from the cleavage treatment contains mainly phenol and acetone and, in addition, a minor quantity of organic by-products such as acetophenone, dimethyl phenyl carbinol, α-methylstyrene, higher phenols (mostly cumyl phenol), acetaldehyde, some polymers of α-methylstyrene and of acetone, some water, the acid catalyst and organic acidic contaminants formed during the oxidation step and/or under the conditions of the cleavage reaction.

Before attempting to separate phenol and acetone from this complex mixture by a sequence of distillations, it is necessary to neutralize the acid components thereof, and this is effectively accomplished by employing a basic material, e. g., aqueous sodium hydroxide, sodium carbonate, or sodium phenolate. Dependent on whether sulfuric, acetic, phosphoric or para-toluene sulfonic acid has been used to catalyze the cleavage reaction, corresponding sodium salts of these acids may be partly precipitated in the effluent, and can be partly removed by filtration thereof, but even then about 25% of the salt remains in solution in the cleavage product mixture (as indicated by an ash analysis value of 0.17% by weight). While the neutralization of the acid catalyst, such as the neutralization of the most frequently employed sulfuric acid with the aid of aqueous sodium phenolate, eliminates the undesirable acidity, it creates new complications during the subsequent purification and recovery of phenol and acetone by distillation. The inorganic salts, such as sodium sulfate, tend to crystallize, plugging the lines and fouling the equipment (reboilers, etc.), and, as a consequence, the processing of the neutralized cleavage mixture gives rise to the problem of how to remove therefrom these salts. In addition to this problem, two other problems are involved: First, how to prevent corrosion of distillation equipment (stills), caused in part by the decomposition of organic sodium carboxylates during the separation of phenol from acetone and from the organic by-product impurities; second, how to prevent the presence of hydrocarbon oil (e. g., α-methylstyrene) in the final phenol product so that it would pass the water dilution test required by the current specifications of the industry.

The present invention eliminates the aforementioned difficulties by a very expeditious and inexpensive treatment of the neutralized cleavage mixture containing dissolved therein inorganic and organic salts. We found that on adding water to this neutralized cleavage mixture in an amount sufficient to cause formation of two phases, the upper organic phase will contain phenol, acetone, and water, and the lower aqueous phase having a volume equal to at least 5% of the volume of the organic phase will contain substantially all of the inorganic and organic salts and a minor amount of phenol and acetone. This addition of water and settling of two phases is carried out in the temperature range from about 50 to about 150° F. Most satisfactory results are obtained by adding water to the neutralized cleavage mixture in such quantities that the aqueous phase has a volume equal to from about 8% to about 20% of the volume of the organic phase. Even larger additions of water have been successfully employed, resulting in the formation of an upper organic phase of phenol, acetone and water and a lower aqueous phase of a volume equal to as much as 50% by volume of the organic phase and containing practically all of the inorganic and organic salts. The removal of salts from the upper phase into the lower phase is entirely unexpected, particularly when it is noted that the upper phase contains not less than 15% by weight of water. Since the neutralized cleavage mixture already contains some water (from 1 to 3% by weight), it follows that the minimum quantity of water present in both phases of that mixture on phase separation is actually equal to about 45% by weight, based on the phenol component. In addition to the effective removal of salts, it is believed that the presence in the cleavage mixture of hydrocarbons, such as unreacted cumene, α-methylstyrene and its polymers, contributes to a more thorough withdrawal of phenol and acetone into the upper phase, upon addition of water to the neutralized cleavage mixture.

Usually, it is preferred to carry out the cleavage of cumene hydroperoxide in the presence of acetone, which may be conveniently provided by recycling a portion of acetone separated from phenol and dehydrated in the subsequent stages of the process. However, if desired, any other water-miscible and acetone-miscible diluent may be employed in effecting a homogeneous cleavage of cumene hydroperoxide, without any adverse effect upon the success of salt removal from the neutralized cleavage mixture by the addition of water, resulting in the formation of an upper organic and a lower aqueous phase in accordance with the principle of the present invention. Cumene may also be successfully employed as a diluent, particularly since it is already available in the first oxidation step of the process for manufacturing phenol and may be either added to the cleavage mixture, or all of the cumene or a portion thereof may be permitted to remain in the oxidation product mixture by reducing the thoroughness of the step of concentrating cumene hydroperoxide in the oxidation product mixture.

The removal of salts from the organic phenol-acetone-water phase obtained by the addition of water to the neutralized cleavage mixture is so thorough that the salt content of the organic phase is less than 0.03% by weight (determined by ash analysis). Often the salt content is found to be reduced even further to a figure of the order of 0.01% by weight (as ash). The possibility of obtaining this reduction in the salt content represents a significant improvement over the previously proposed technique of filtration for the removal of salts. As mentioned hereinbefore, filtration, even the most thorough one, leaves as much as 0.17% by weight of salts dissolved in the neutralized cleavage mixture. Furthermore, we pointed out that it does not completely eliminate the dangers of corrosion of the equipment, and, in the subsequent removal of phenol from acetone by distillation, traces of the organic salts, which remain in the filtrate of neutralized cleavage mixture, are likely to decompose into acidic constituents which may promote corrosion.

We said that the addition of water for the purpose of removing (extracting) the salts in accordance with the present invention may be conveniently carried out at a temperature in the range from about 50 to about 150° F. The optimal temperature may vary somewhat depending on the nature of the salt being removed. Thus, when sulfuric acid is employed to split up cumene hydroperoxide and, as a consequence, the salt in the neutralized cleavage mixture mainly consists of $Na_2SO_4$, temperatures from 70 to 90° F. are found to be most satisfactory, the lower temperatures in this range requiring employment of less water. For instance, when 25% by weight of water is added to the neutralized cleavage mixture at 75° F., about half of this water goes into the upper organic phase upon phase separation; when the same quantity of water is added at 90° F., about 60% thereof goes into the organic phase. On the other hand, the thoroughness of salt removal, particularly of the organic salts (as judged from the data of ash analysis), improves at higher temperatures. The amount of water which may be added varies within wide limits, from 15 to 75%, based on the weight of the cleavage reaction mixture, having been successfully employed. This results in the presence of from 2.5 to 56% of water in the lower phase, based on the volume of the upper organic phase. It will be noted, however, that in employing amounts of water, lower than about 25% by weight, e. g., from 15 to 20% by weight (corresponding to 2.5 to 7% of water in the lower phase based on the volume of the upper organic base), the temperature should preferably be not less than about 70° F. to avoid the possibility of separation of a solid salt phase.

The exact nature of the phenomena involved in the removal of salts into the lower aqueous phase upon addition of water in accordance with the present invention is not definitely known; it may be that the presence of hydrocarbons in the cleavage mixture, namely, α-methylstyrene, its polymers and unreacted cumene, may influence the passage of salts into the lower phase. Whatever be the cause, the addition of water provides a solution to a problem which heretofore constituted a serious drawback for the recovery of phenol. Moreover, the presence of water in the upper phase raises no difficult problem with respect to its subsequent removal to obtain the specification phenol, and, on the contrary, a superior final phenol product is obtained, as rated on the basis of the water dilution test.

For the better understanding of the present invention, reference is made to the accompanying drawing in which Figure 1 diagrammatically represents the general operating features of our method of salt removal (extraction) as applied to a neutralized cleavage mixture produced by heating cumene hydroperoxide with sulfuric acid.

In Figure 1, the reaction mixture leaving the cleavage stage enters line 1 to be joined by the solution of a neutralizing agent, e. g., 25% solution of sodium phenolate, arriving through line 2. The mixture enters mixer 3 and the acid components become thoroughly neutralized, whereupon the neutralized mixture enters line 4. A stream of water at a suitable temperature arrives through line 5 and joins the neutralized mixture in line 4, whereupon the combined streams enter mixer 6. After passing through this second mixer, the liquid phenol-acetone-water mixture enters settler 8, where two phases separate, the lower aqueous phase being recycled through line 11 to the fresh-water line 5. A bleed-off line 12 removes the aqueous salt solution which may be discarded to sewer or treated to recover minor amounts of phenol and acetone contained in it. The upper organic phase containing phenol, acetone and water is sent through line 13 for further processing (separation of phenol from acetone, dehydration and purification of each of them, etc.).

Figure 2:
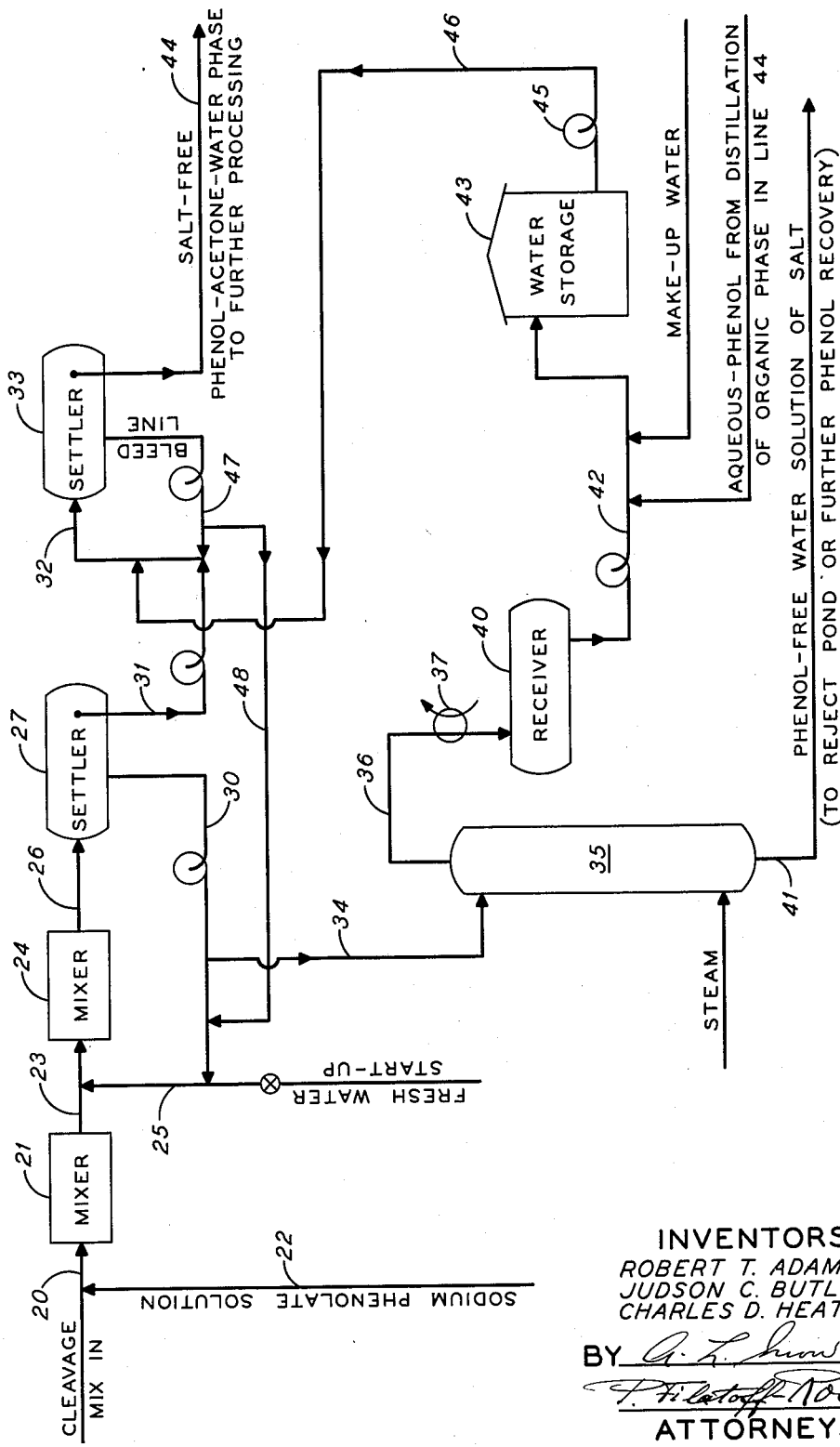

Figure 2 of the same drawing represents a flow diagram of a particular variant of the method of our invention for salt removal from the reaction mixture resulting after cleavage of cumene hydroperoxide for the purpose of obtaining phenol and acetone. In Figure 2 the cleavage mixture containing phenol, acetone and other organic by-products of the oxidation and cleavage reactions, as well as the acid catalyst and some water, passes through line 20 into mixer 21. It is neutralized with the aid of an aqueous solution of an appropriate basic material such as sodium phenolate, carried in line 22. The neutralization is completed in mixer 21 and the neutralized mixture passes through line 23 into mixer 24. Water is introduced into mixer 24 through valve-controlled start-up line 25. From mixer 24, the liquid mixture passes through line 26 into settler 27. Two phases separate in this settler. The lower aqueous phase is recycled through lines 30, 25 and 23 into mixer 24, and the organic upper phase is sent through lines 31 and 32 to a second settler 33, which may be named "organic phase washer." A portion of the aqueous phase from settler 27 is bled off through line 30 and passes through line 34 to distillation column 35 where traces of phenol and acetone are stripped therefrom with the aid of steam. The overhead containing traces of phenol and acetone passes through line 36 to be condensed in condenser 37, whence it flows into a receiver 40. The bottoms from the distillation column 35 represent an essentially phenol-free water solution of the bulk of inorganic and organic salts and are withdrawn through line 41 to a reject pond or may be sent for an additional processing to recover traces of phenol therefrom. The condensed aqueous liquid in receiver 40 is pumped through line 42 to a water storage vessel 43 where it is combined with aqueous phenol produced during the eventual separation of the components of the salt-free mixture coming out from settler 33 through line 44, and with whatever amount of make-up water may be necessary. From water storage vessel 43, water is pumped by pump through lines 46 and 32 into settler 33 where two phases, an upper organic phase and a lower aqueous phase, are formed. The aqueous phase is recirculated through lines 47 and 32 to insure the desired thoroughness of the salt removal until the ultimate salt content of the upper organic phase is not higher than 0.03% by weight (based on the initial cleavage product mixture and determined by ash analysis). This substantially salt-free phenol-acetone-water upper phase is withdrawn through line 44 to be further processed, namely, to separate phenol and acetone from each other and from other impurities. This may be done, e. g., by a succession of fractional distillations, in which, first, an acetone-rich fraction is recovered overhead and a phenol-rich fraction containing water and minor amounts of organic impurities is recovered as bottoms; thereupon the acetone overhead is successively distilled to remove acetaldehyde and to separate substantially pure acetone from water, phenol and other admixtures, while the phenol-rich bottoms fraction is also treated in a succession of distillations to separate substantially pure phenol from a fraction containing water and organic impurities, such as α-methylstyrene and unreacted cumene. Upon settling of this latter fraction or of the bottoms from the distillation of pure acetone, two phases are formed: A water phase and an oil phase containing the organic impurities. These two phases may be readily separated from each other, e. g., by decantation, and the water phase may be rejected to sewer. However, since this water still contains traces of phenol, it is recycled, either entirely or in part, to be combined with the make-up water being added to the neutralized cleavage mixture. A portion of the lower aqueous phase from settler 33 is diverted by way of line 47 into line 48 connected to line 30 and thence into line 25 and line 23 where it will be combined with the incoming neutralized cleavage mixture about to enter the salt removal stage of the process.

The removal of inorganic and organic salts in accordance with our invention may be also achieved by using more water in forming aqueous dilutions of basic materials, such as sodium hydroxide, sodium phenolate or sodium carbonate, to neutralize the acidity in the cleavage product mixture. Thus, in lieu of 25% by weight of sodium phenolate, a dilution of approximately 5.0% of sodium phenolate could be used. Instead of introducing the water at a point subsequent to the introduction of sodium phenolate or a similar neutralizing agent, the two streams may be combined, eliminating thereby the requirement for additional mixing equipment such as mixer 6 in Fig. 1 and mixer 24 in Fig. 2. The make-up water and the aqueous phenol recycle may likewise be combined with the stream of aqueous neutralizing agent.

The thoroughness of the salt removal obtained in accordance with the method of our invention is amply illustrated by the following example in which a typical cleavage mixture was employed. This mixture was neutralized on leaving the cleavage vessels with a solution (37%) of sodium phenolate. It contained:

| | Per cent by weight |
|---|---|
| Phenol | 40.3 |
| Acetone | 45.0 |
| Hydrocarbons | 4.6 |
| Water | 3.6 |
| Organic impurity (acetophenone, etc.) | 5.4 |
| Sodium sulfate | 0.9 |
| Unidentified | 0.2 |
| Total | 100.0 |

Water was added to this cleavage mixture in an amount equal to 26.6% by weight thereof. Two phases separated. The upper organic phase took up 12 of the 26.6% by weight of the added water, while the lower phase was found to have a volume equal to about 14.5% of the volume of the organic phase and, upon analysis, showed the following composition:

78.9% by weight of water
5.5% by weight of salt
1.2% by weight of phenol
14.4% by weight of acetone 100.0% total The salt content in the organic phase determined by the ash analysis of phenol was a mere 0.03% by weight as compared to the value of 0.16% by weight obtained from a similar cleavage mixture after it was filtered to effect salt removal.

While our invention is described hereinabove with reference to the removal of salts present in the neutralized product mixture obtained in the cleavage of cumene hydroperoxide in the process for manufacturing phenol, those skilled in the art will recognize that the salt removal technique disclosed can also be employed in treating similar product mixtures, for example, to remove salt from the neutralized mixture obtained by the cleavage of cumene hydroperoxides in the manufacture of cresols.

We claim:

1. A process for the production of phenol and acetone which comprises decomposing a cumene hydroperoxide concentrate containing about 90% by weight of cumene hydroperoxide and substantially free of cumene by heating said concentrate in the presence of an acid catalyst, neutralizing the decomposition mixture, mixing water with the neutralized decomposition mixture in an amount sufficient to form upon settling an organic upper phase containing substantially all of the phenol and acetone and some water, and an aqueous lower phase having a volume equal to at least 5% of the volume of said organic phase and containing in solution substantially all of the salts formed in the aforesaid neutralization, and separating said organic upper phase from said aqueous lower phase.

2. A process for the production of phenol and acetone which comprises decomposing a cumene hydroperoxide concentrate containing about 90% by weight of cumene hydroperoxide and substantially free of cumene, by diluting said concentrate with acetone and heating the diluted concentrate in the presence of an acid catalyst, neutralizing the decomposition mixture, mixing water with the neutralized decomposition mixture in an amount sufficient to form upon settling an organic upper phase containing substantially all of the phenol and acetone and some water, and an aqueous lower phase having a volume equal to at least 5% of the volume of said organic phase and containing in solution substantially all of the salts formed in the aforesaid neutralization, and separating said organic upper phase from said aqueous lower phase.

3. The method as defined in claim 1, in which said addition of water and said settling of phases is carried out at a temperature from about 50° F. to about 150° F.

4. The method as defined in claim 1, in which said addition of water and said settling of phases is carried out at a temperature from about 50° F. to about 150° F., and said water is added in such an amount that the resulting aqueous lower phase has a volume equal to at least 5% to about 50% of the volume of said organic phase.

5. The method as defined in claim 1, in which said addition of water and said settling of phases is carried out at a temperature from about 50° F. to about 150° F. and said water is added in such an amount that the resulting lower aqueous phase has a volume equal to about 8% to about 20% of the volume of said organic phase.

6. A process for the production of phenol and acetone which comprises decomposing a cumene hydroperoxide concentrate containing about 90% by weight of cumene hydroperoxide and substantially free of cumene by heating said concentrate to a temperature from about 150° F. to about 300° F. in the presence of an acid catalyst, neutralizing the decomposition mixture, admixing water with said neutralized decomposition mixture and settling the mixture at a temperature from about 70° F. to about 90° F., said water being added in such an amount as to form an upper organic phase containing substantially all of the phenol and acetone and some water, and an aqueous lower phase having a volume equal to from at least 5% to about 50% of the volume of the organic phase and containing in a solution substantially all of the salts formed in the aforesaid neutralization, and separating said organic upper phase from said aqueous lower phase.

7. A process for the production of phenol and acetone which comprises decomposing a cumene hydroperoxide concentrate containing about 90% by weight of cumene hydroperoxide and substantially free of cumene by diluting said concentrate with acetone, heating the diluted concentrate to a temperature from about 150° F. to 300° F.

in the presence of an acid catalyst, neutralizing the decomposition mixture, mixing water with the neutralized decomposition mixture in an amount sufficient to form upon settling at a temperature from about 50° F. to about 150° F. an organic upper phase containing substantially all of the phenol and acetone and some water, and a lower aqueous phase having a volume equal to at least 5% of the volume of the organic phase, and separating said organic upper phase from said aqueous lower phase.

8. A process for the production of phenol and acetone which comprises decomposing a cumene hydroperoxide concentrate containing abou 90% by weight of cumene hydroperoxide and substantially free of cumene by heating said concentrate in the presence of an acid catalyst, neutralizing the decomposition mixture, mixing water with the neutralized decomposition mixture in an amount sufficient to form upon settling at a temperature from about 70° F. to about 90° F. an organic upper phase containing substantially all of the phenol and acetone and some water, and a lower aqueous phase having a volume equal to at least 5% of the volume of the organic phase, and separating said organic upper phase from said aqueous lower phase.

9. A process for the production of phenol and acetone which comprises heating a cumene hydroperoxide concentrate containing about 90% by weight of cumene hydroperoxide and substantially free of cumene to a temperature in the range from about 150° F. to about 300° F. in the presence of sulfuric acid, neutralizing the decomposition mixture with sodium phenolate, mixing water with said neutralized decomposition mixture in an amount sufficient to form upon settling at a temperature from about 50° F. to about 150° F. an organic upper phase containing substantially all of the phenol and acetone and some water, and an aqueous lower phase having a volume equal to at least one-twentieth of the volume of the organic phase and containing in solution substantially all of the sodium sulfate and sodium carboxylates formed during said neutralization, and separating said organic upper phase from said aqueous lower phase.

10. A process for the manufacture of phenol by oxidizing liquid-phase cumene with an oxygen-containing gas in the presence of an aqueous alkali to form an oxidation product mixture comprising cumene hydroperoxide and unreacted cumene, separating substantially all of the unreacted cumene from said cumene hydroperoxide, heating said separated cumene hydroperoxide with a catalytic amount of an inorganic acid in the presence of acetone as a diluent to effect decomposition of said cumene hydroperoxide into phenol and acetone, recovering the decomposition product mixture containing phenol, acetone, organic side-reaction products and the acid catalyst, and neutralizing the decomposition product mixture, mixing water with said neutralized decomposition mixture, at a temperature from about 50° F. to 150° F., thereby causing formation of an organic upper phase containing substantially all of the phenol and acetone and some water, and an aqueous lower phase having a volume equal to at least 5% of the volume of the organic phase and containing in solution substantially all of the salts formed in said neutralization, and separating said organic upper phase from said aqueous lower phase.

11. A process for producing acetone and phenol from a cumene hydroperoxide concentrate containing at least 90% by weight of cumene hydroperoxide and substantially free of cumene, which comprises heating said concentrate with a catalytic amount of an acid to decompose said hydroperoxide to phenol and acetone, neutralizing the decomposition reaction mixture, mixing the neutralized decomposition mixture with sufficient water to cause formation, upon settling at a temperature below 150° F., of an upper liquid, predominantly organic phase and a lower aqueous phase having a volume equal to at least one-twentieth of the volume of the organic phase, separating the two phases, and recovering phenol and acetone from the organic phase by fractional distillation.

12. A process for producing phenol and acetone which comprises oxidizing cumene with air to form a mixture of cumene and cumene hydroperoxide, separating a cumene hydroperoxide-rich fraction essentially free of cumene from the oxidation reaction product, decomposing the cumene hydroperoxide fraction by diluting it with acetone and heating the diluted fraction in the presence of an acid catalyst, neutralizing the decomposition mixture with sodium phenolate, adding water to the decomposition mixture prior to its neutralization in an amount sufficient to form upon neutralization and settling an upper organic phase containing substantially all of the phenol and acetone and some water, and a lower aqueous phase having a volume equal to at least one-twentieth of the volume of the upper phase and containing substantially all of the salts formed during neutralization, separating these two phases, discarding the lower aqueous phase, fractionally distilling the upper phase to separate an overhead fraction comprising acetone and a bottoms fraction comprising phenol, water and minor amounts or organic impurities, distilling said bottoms fraction to separate phenol from a fraction comprising water and substantially all of the organic impurities, and settling this latter fraction to separate a water phase from an oil phase containing said organic impurities.

13. A process for producing phenol comprising the steps of oxidizing cumene with air to form a mixture of cumene and cumene hydroperoxide, separating a cumene hydroperoxide-rich fraction having a cumene hydroperoxide content of about 90% by weight and substantially free of cumene from the oxidation reaction product, decomposing the cumene hydroperoxide of said fraction in the presence of catalytic amounts of an acid to form phenol and acetone, neutralizing the acid catalyst and organic acid impurities in the decomposition mixture to obtain a crude reaction product comprising phenol, acetone, minor amounts of hydrocarbons, and salts formed during the neutralization step, adding water to the decomposition mixture prior to its neutralization in an amount sufficient to form upon neutralization and settling an upper organic phase containing substantially all of the phenol and acetone and some water, and a lower aqueous phase having a volume equal to at least one-twentieth of the volume of the upper phase and containing substantially all of the salts formed during neutralization, separating these two phases, discarding the lower aqueous phase, fractionally distilling the upper phase to separate an overhead fraction comprising acetone and a bottoms fraction comprising phenol, water and minor amounts of organic impurities, distilling said bottoms fraction to separate phenol from a fraction comprising water and substantially all of the organic impurities, settling this latter fraction to separate a water phase from an oil phase containing said organic impurities, and recycling at least a portion of said water phase to the decomposition reaction mixture.

14. A process for the production of phenol and acetone which comprises decomposing a cumene hydroperoxide concentrate containing about 90% by weight of cumene hydroperoxide and substantially free of cumene by heating said concentrate in the presence of an acid catalyst, neutralizing the decomposition mixture, adding water to the neutralized decomposition mixture in an amount sufficient to form, upon neutralization and settling, an organic upper phase containing substantially all of the phenol and acetone and some water, and an aqueous lower phase having a volume equal to at least 5% of the volume of said organic phase and containing in solution substantially all of the salts formed in the aforesaid neutralization, and separating said organic upper phase from said aqueous lower phase.

15. A process for producing phenol comprising the steps of oxidizing cumene with air to form a mixture of cumene and cumene hydroperoxide, separating a cumene hydroperoxide-rich fraction substantially free of cumene from the oxidation reaction product, decomposing the cumene hydroperoxide of said fraction in the presence of catalytic amounts of an acid to form phenol and acetone, neutralizing the acid catalyst and organic acid impurities in the decomposition mixture to obtain a crude reaction product comprising phenol, acetone, minor amounts of hydrocarbons, and salts formed during the neutralization step, adding water to the decomposition mixture prior to its neutralization in an amount sufficient to form upon neutralization and settling an upper organic phase containing substantially all of the phenol and acetone and some water, and a lower aqueous phase having a volume equal to at least one-twentieth of the volume of the upper phase and containing substantially all of the salts formed during neutralization, separating these two phases, discarding the lower aqueous phase, fractionally distilling the upper phase to separate an overhead fraction comprising chiefly acetone with small amounts of water, phenol and organic impurities, and the bottoms fraction comprising phenol, water and minor amounts of organic impurities, distilling said overhead fraction to separate acetone from a fraction comprising water and substantially all the organic impurities, distilling said bottoms fraction to separate phenol from a fraction comprising water and substantially all the organic impurities, settling both these water-containing fractions to separate a water phase from an oil phase containing said organic impurities and recycling at least a portion of said water phase to the decomposition reaction mixture.

16. A process for the production of phenol and acetone which comprises decomposing a cumene hydroperoxide concentrate containing about 90% by weight of cumene hydroperoxide and substantially free of cumene by heating said concentrate in the presence of an acid catalyst, adding to the decomposition reaction mixture a neutralizing agent and water in an amount sufficient to form upon neutralization and settling an organic upper phase containing substantially all of the phenol and acetone and some water, and an aqueous lower phase having a volume equal to at least 5% of the volume of said organic phase and containing in solution substantially all of the salts formed in the neutralization, and separating said organic upper phase from said aqueous lower phase.

References Cited in the file of this patent

UNITED STATES PATENTS

| | | |
|---|---|---|
| 1,213,465 | Davis | Jan. 23, 1917 |

FOREIGN PATENTS

| | | |
|---|---|---|
| 626,095 | Great Britain | July 8, 1949 |